March 14, 1961  G. EGGERS ET AL  2,974,907
APPARATUS FOR THE STABILISATION AND CONTROL
IN VERTICAL FLIGHT OF AN AIRCRAFT
Filed April 9, 1958  5 Sheets-Sheet 1
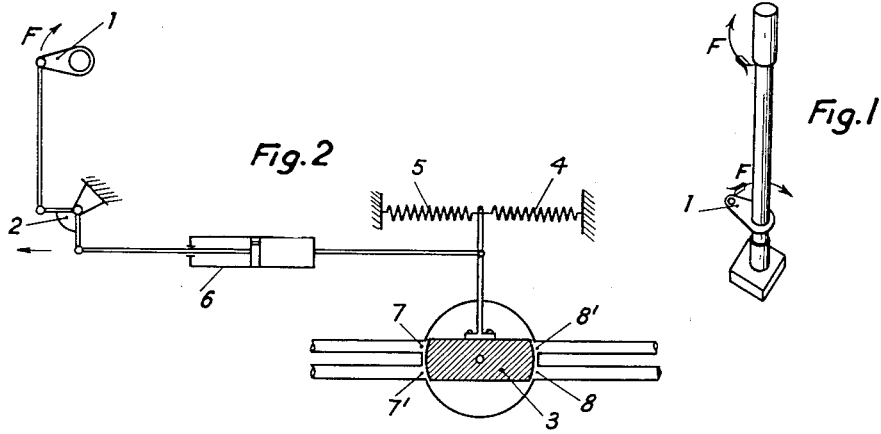
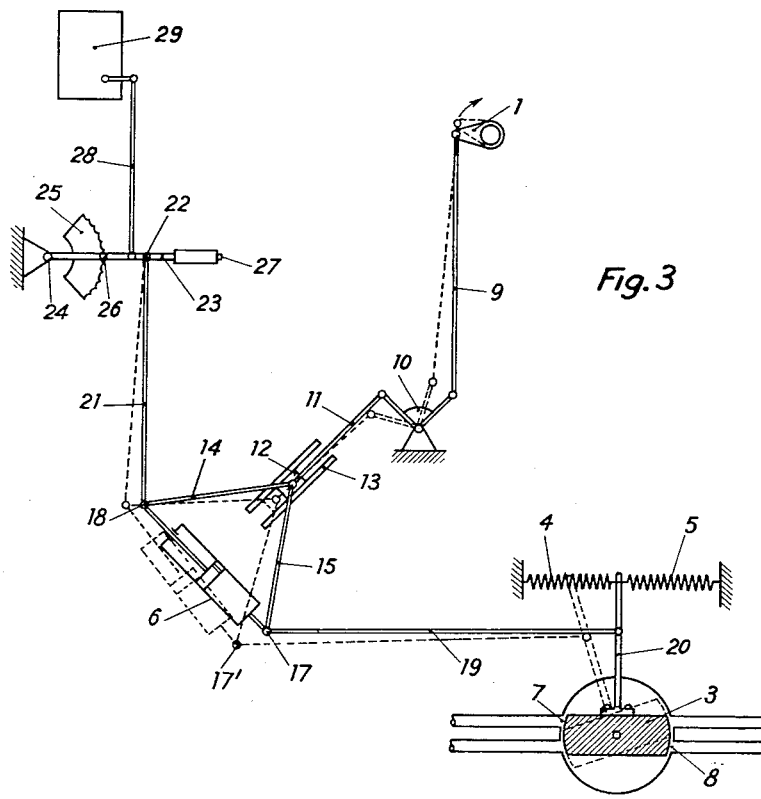
Inventors
Gerhard Eggers &
Günther Ernst
By
Watson, Cole, Grindle & Watson
Attorneys

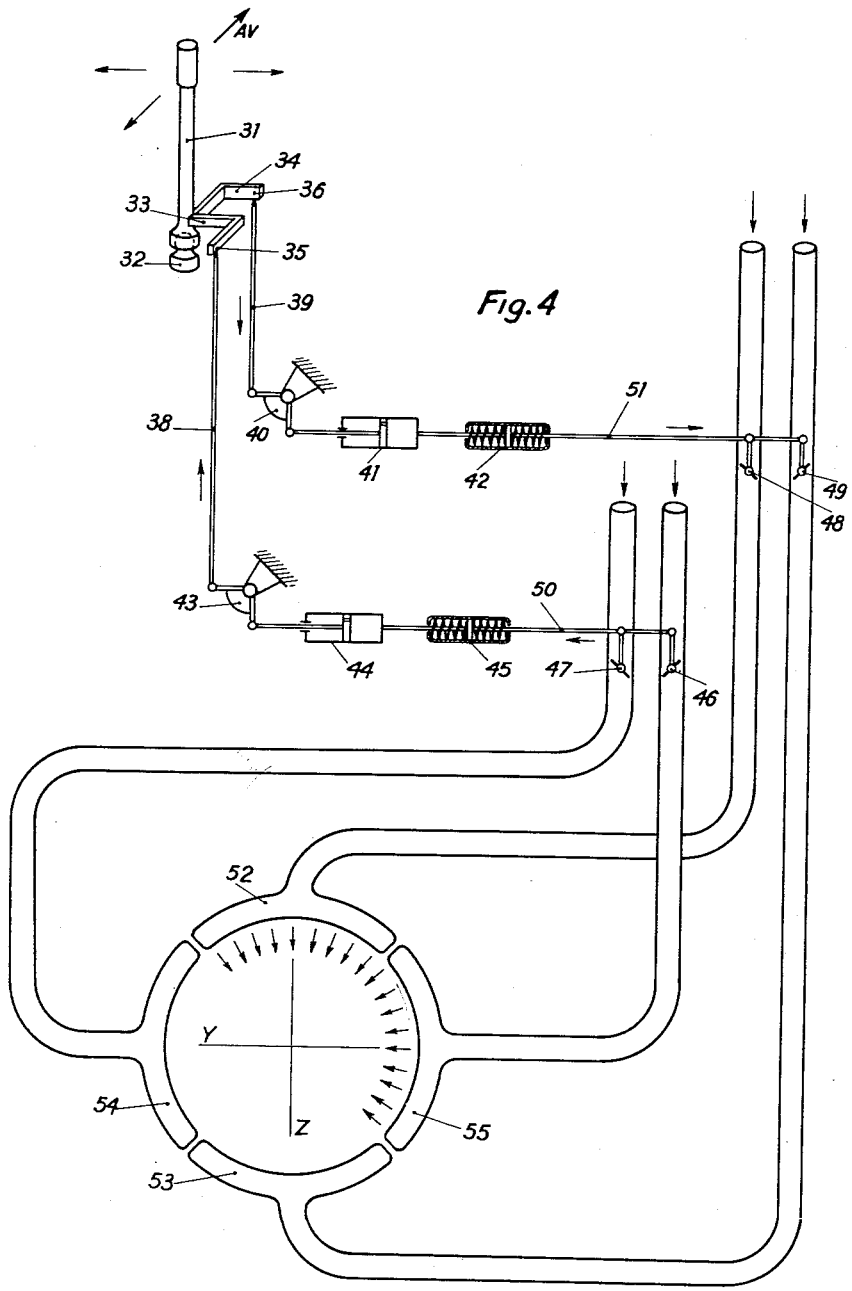

March 14, 1961 G. EGGERS ET AL 2,974,907
APPARATUS FOR THE STABILISATION AND CONTROL
IN VERTICAL FLIGHT OF AN AIRCRAFT
Filed April 9, 1958 5 Sheets-Sheet 5

Inventors
Gerhard Eggers
Günther Ernst
By
Watson, Cole, Grindle & Watson
Attorneys United States Patent Office 2,974,907
Patented Mar. 14, 1961

2,974,907
APPARATUS FOR THE STABILISATION AND CONTROL IN VERTICAL FLIGHT OF AN AIRCRAFT

Gerhard Eggers and Günther Ernst, Dammarie-les-Lys, France, assignors to Societe Nationale d'Etude et de Construction de Moteurs d'Aviation, Paris, France, a French company Filed Apr. 9, 1958, Ser. No. 727,363
Claims priority, application France Apr. 15, 1957
8 Claims. (Cl. 244—52)

It is known that aircraft taking off vertically, that is to say at zero speed, are subjected on the one hand to the gyroscopic effects of the rotors of the turbo-jet engines with which the aircraft are equipped, and on the other hand to the effects of external disturbing influences, such as for example gusts of wind. These effects tend to unbalance the aircraft, and since its speed is very slow or nil, the conventional aerodynamic control surfaces are inoperative.

Whether it is a question of unbalance, reestablishing equilibrium, or a change of course, the movement of an aircraft may be considered as being the resultant of three movements of angular pivoting about three axes which are disposed at right angles to one another and which are known as the reference axes, one of which, the axis of the aircraft itself, is directed vertically in the case in question, and the two others are disposed horizontally. Relatively to the position of the pilot, one of these two latter axes is known as the pitch axis and the other as the yaw axis whereas the axis of the aircraft itself is known as the roll axis.

One of the objects of the invention is to control the angular movements of the aircraft about its three reference axes by creating, owing to the manipulation of members controlling ejections of compressed gas or air at appropriate points and with a desired orientation, temporary torques about the said axes which produce, without time-lag or phase displacement, impulses of short duration which give rise to continuous angular pivoting movements at constant speed, which will be stopped when desired, without time-lag or phase displacement, by the subsequent creation of temporary torques of reverse sign to that of the preceding torques, producing impulses of short duration which compensate those which gave birth to the continuous pivoting movements of the aircraft and consequently stopping the latter movements.

In order to simplify the task of the pilot, the connection between the control lever and the jet control members is according to the invention organised in such a manner that on the one hand the movement of the said lever towards a position in a given sense relatively to a neutral position causes an impulse of short duration producing a uniform angular pivoting movement in the same sense, and that on the other hand the return of the control lever to its neutral position automatically produces the qualitative and quantitative impulse necessary for compensating the angular pivoting movement which is going on, and consequently for stopping same. The duration of the uniform angular pivoting movement will also be strictly equal to the duration of time during which the control lever is kept out of its neutral position.

To this end there is arranged in the said connection a dashpot or equivalent means whose purpose is to ensure, at a speed dependent on its construction, the automatic return to the neutral position of the jet control member, under the action of an appropriate opposing spring, although the control lever is kept held in its same non-neutral position. Also, when the control lever is returned to the neutral position, this displacement of the lever will actuate the jet control member as in the preceding case but in an opposite direction, thus causing, without delay or phase displacement, the second impulse of short duration regulated by the dashpot but in a direction opposite to that of the first, the magnitude of which will be what is necessary for compensating the continuous pivoting movement which is proceeding at the time, and consequently for stopping same.

The following description with reference to the accompanying drawings will set forth clearly the various features of the invention and the manner in which they are carried out.

Fig. 1 is a perspective view of the lever for controlling the direction of the aircraft relatively to its vertical reference axis (roll axis);

Fig. 2 illustrates the principle of the connection according to the invention between the control lever of Fig. 1 and a compressed air distributor valve;

Fig. 3 shows the combination of the control system of Fig. 2 with a system for the automatic compensation of the gyroscopic effects due to the accelerations and decelerations of the rotor of the turbo-jet engine with which the aircraft is equipped;

Fig. 4 illustrates the application of the control apparatus according to the invention to the control of the position of the aircraft about its pitch and yaw axes, with compensation of gyroscopic effects tending to incline the aircraft relatively to the axis about which it is to be pivoted;

Figure 3A:
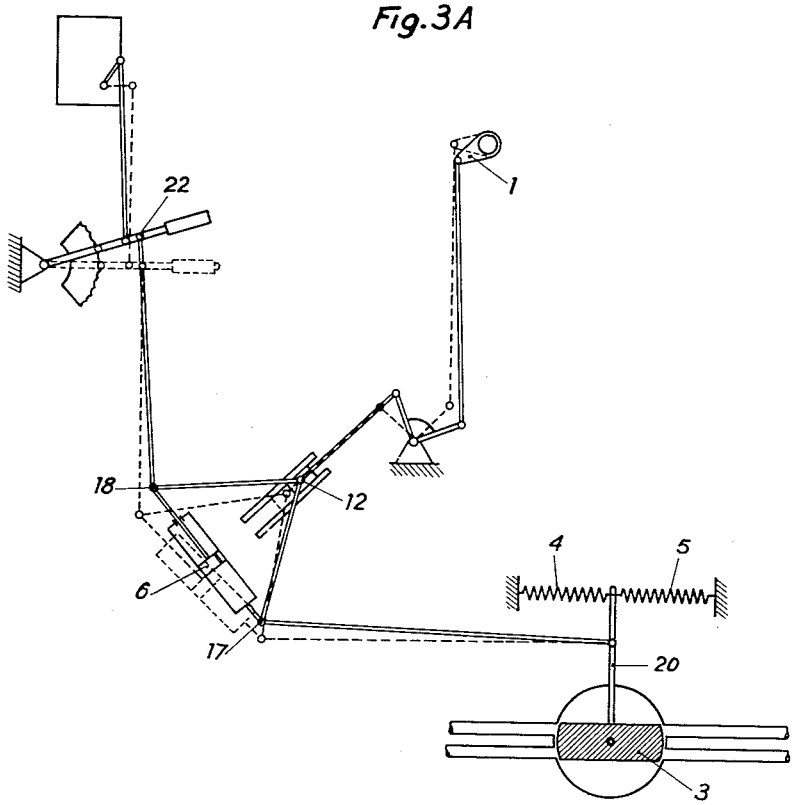
Figs. 3a, 3b, 3c are diagrammatic views illustrating the combination of Fig. 3 in particular positions of use.

Fig. 1 shows a vertical control lever which can be rotated on itself as and when desired, about its axis, in the direction of the arrows F or in the opposite direction, and which in this rotational movement entrains the lug 1 fast with the said lever, which lug is shown again in Figs. 2 and 3. This control lever is parallel to the roll axis of the aircraft, this axis being vertical during vertical flight. According to the invention a clockwise pivoting movement of the aircraft about the X axis will correspond to a clockwise rotation of the said lever, and vice versa.

In Fig. 2, the lug 1 controls, through the agency of rodding and lever 2, a four-way distributor valve 3 which is held in or urged towards the illustrated neutral position by opposing springs 4 and 5. A dashpot 6 is interposed in the rodding.

If for example the pilot turns the control lever in the direction of the arrow F (clockwise), the distributor valve 3 opens up the ducts 7 and 8 which supply compressed air to two nozzles (not shown) arranged relatively to the roll axis in such a manner that they create instantaneously, i.e. without time-lag or phase displacement, a torque such that the aircraft pivots about the said axis, in the same direction as that of the rotation of the control lever and lug 1.

Under the action of the return springs 4 and 5, the distributor valve 3 then resumes its neutral position at a predetermined speed (or with a predetermined time-lag) owing to the presence of the dashpot 6 whose piston and cylinder move relatively to one another by the necessary amount.

Under the effect of the short-duration impulse thus received, the aircraft will be driven about the roll axis with a continuous pivoting movement at constant speed in the direction corresponding to that of the rotation of the control lever, which will continue until the pilot brings the control lever back to its neutral position. At this instant, the distributor valve 3 will be driven in the direction opposite to its previous displacement, uncovering the two other ducts 7' and 8' associated with the ducts 7 and 8, but not unmasking the latter, and thus permitting the supply of compressed air to other conjugate nozzles (not shown) producing, without time-lag or phase displacement, a temporary torque of the same duration as the first torque, under the combined action of springs 4 and 5 and dashpot 6, but of opposite sign. The distributor valve 3 will then resume its neutral position, and since the amplitudes of all the movements and times are identical and in opposite sense to the amplitudes of the first impulse, the second impulse received by the aircraft will have exactly the necessary value to compensate and consequently stop, without time-lag or phase displacement, the angular pivoting movement proceeding at that particular time.

This first example of embodiment, specially chosen for its simplicity, will suffice to show fully the principle according to the invention of stabilising and controlling an aircraft, the said principle consisting in obtaining, by the simple out and back movement of a control member relatively to a neutral or zero position, with any desired duration of retention in the extreme non-zero position, an impulse of short duration which gives rise to a continuous constant-speed pivoting movement about the reference axis in question, the duration of the said movement being exactly equal to the duration of time during which the control member is kept out of the zero position, and the said movement being stopped at will by an impulse which is identical to the first but in the opposite direction, automatically brought about by the return of the control member to its neutral or zero position.

The example of application given hereinafter concerns only a stabilisation or orientation about the vertical roll axis at the desire of the pilot. In practice, since the aircraft is equipped with a turbo-jet engine whose operation is variable at the will of the pilot and the axis of whose rotor is the roll axis, it is necessary to provide for neutralising the effects of the accelerations and decelerations of this rotor, which disturb the said orientation.

It appears advantageous to use for this neutralisation the same distributor valve 3 as in the first example described, whilst retaining the same orientation means at the disposal of the pilot.

This combination constitutes a second example of embodiment which is illustrated in Fig. 3.

In this Fig. 3, it will be seen that the rod 9 coming from the lug 1 controls, through the agency of lever 10 and rod 11, a slide 12 which is displaceable in the slide-way 13. Two rods 14 and 15 of equal length to one another and independent of one another are fixed at one of their ends by an articulation to the slide 12. The dashpot 6 is interposed between their two other ends, being connected to the said ends at the articulations 17 and 18. A rod 19 is connected to the articulation 17 and controls the directional distributor valve 3 which is stabilised in the zero or neutral position by opposing springs 4 and 5. A further rod 21 connects the articulation 18 to the throttle hand lever 23 of the turbo-jet engine by means of the articulation 22. This throttle lever can pivot about a pin 24 and can be immobilised on a toothed sector 25 by a stud 26 controlled by the button 27 situated on the grip of the throttle lever. A rod 28 connects the throttle lever to the regulator 29 of the turbo-jet engine.

Similarly to the example illustrated in Fig. 2, when the pilot wishes to turn the aircraft about the roll axis without accelerating or decelerating the jet engine, for example in order to find an appropriate landing site, he turns the control lever fast with the lug 1 in the desired direction and consequently displaces the slide 12 in the slideway 13. But since the articulation 22 on the throttle lever remains motionless, the longitudinal translational movement of the slide 12 forces the point 18 to describe a concave-curvature arc towards 22, in dependence on the displacements of the slide 12 and articulation 18. This point 17 is thus brought to 17' which, through the intermediary of the rod 19 and lever 20, determines the displacement of the distributor 3 in the desired direction so as to bring about an impulse in the direction corresponding to that of the rotation of the control lever effected by the pilot, the springs 4–5 and dashpot 6 then acting as has been stated hereinbefore.

If, on the contrary, the pilot wishes to modify the running condition of the jet engine without the influence of the gyroscopic effects produced by the rotating masses pivoting the whole aircraft about the roll axis in the sense of the acceleration or deceleration, the positive or negative compensation is carried out in the following manner:

The action of the pilot on the throttle lever alone, that is to say without acting on the control lever fast with the lug 1, and thus without displacing the slide 12, has the result that the points 17 and 18 describe an arc of a circle of centre 12 and act on the distributor valve 3. The throttle lever 23 is so connected that the impulse resulting from bringing the distributor valve 3 into action compensates in the desired sense the gyroscopic effect produced by an acceleration or deceleration of the jet engine, the springs and dashpot then acting so as to produce the stopping impulse.

Then if the pilot wishes simultaneously to modify the operation of the jet engine and pivot the aircraft about its roll axis, for landing for example, the combination according to the invention will automatically establish the algebraic sum of the two impulses.

In fact, referring now to Fig. 3a, it will be seen that in the case where the pilot wishes to pivot the aircraft in the same direction as the reaction of the rotation of the rotor of the turbo-jet engine, and to accelerate the engine at the same time, the distributor valve 3 will not be subjected to any displacement owing to the withdrawal of the slide 12, and the pivoting of the aircraft will be effected solely due to the reaction of the accelerations. If, on the contrary, the pilot wishes to pivot the aircraft in the opposite sense, it will be noted readily from the figure that a rotation of the same value of the control lever and of the lug 1, but effected in the opposite sense, will increase the amplitude of the action of the throttle lever on the distributor valve 3, thus ensuring an increase in the admission of compressed air to the nozzles creating the torque about the roll axis. There is thus obtained an impulse of more than adequate energy as regards compensating for the effect of the acceleration of the rotor, the surplus portion of the said energy ensuring the desired pivoting movement of the aircraft.

Figure 3B:
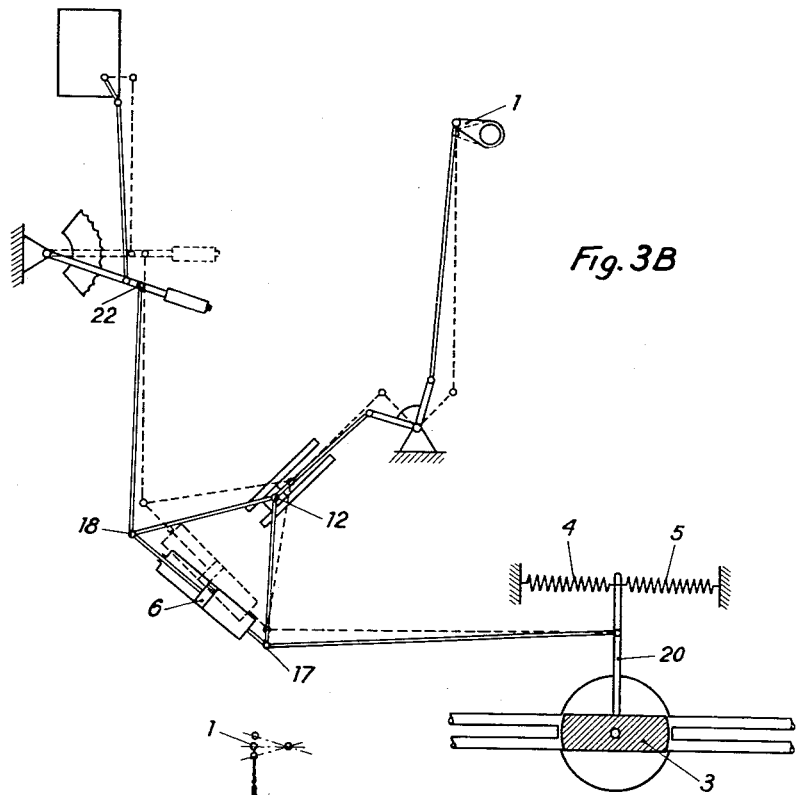

The foregoing explanations relating to the case of accelerating the jet engine combined with pivoting the aircraft, are also valid in the case of deceleration combined with the said pivoting movement. Fig. 3b corresponds to this case, the aircraft being pivoted in the opposite sense to the rotation of the rotor of the turbo-jet engine, and the simultaneous action of the displacements of the throttle lever and control lever not producing any displacement of the distributor.

Figure 3C:
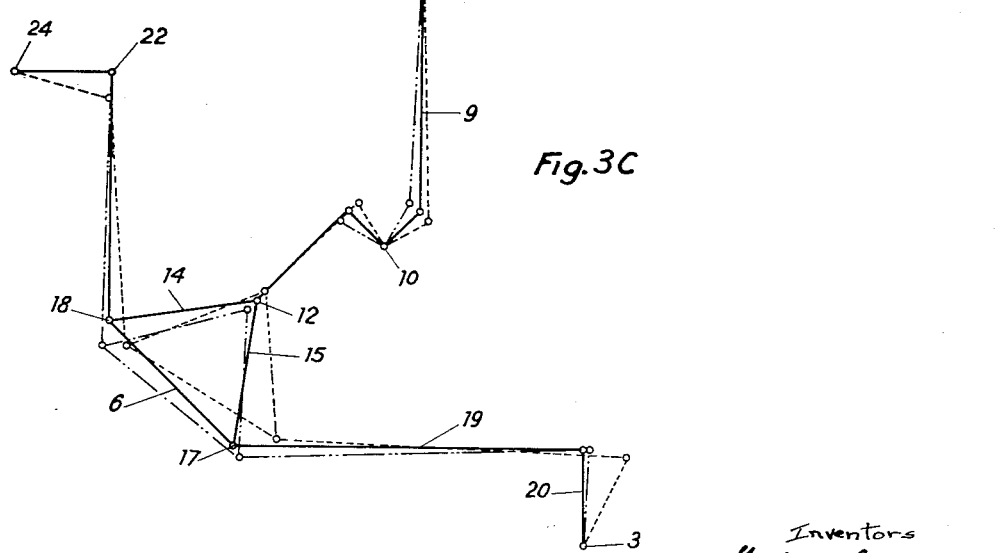

To supplement these explanations, Fig. 3c is a diagram illustrating, in the case of a deceleration, the composition of the displacements of the throttle lever and control lever with their resultant on the rotary displacement of the distribution valve 3.

The examples of application which have just been described concern only the stabilisation and control of the aircraft about its vertical roll axis. A description will now be given of two examples of application concerning the stabilisation and control about the pitch and yaw axes, with automatic compensation of the gyroscopic effects tending to incline the aircraft relatively to the axis about which it is to be pivoted.

In the example of application illustrated in Fig. 4, the control member is a control column 31 which is mounted on a ball-and-socket support 32 fast with the aircraft, and which can be displaced in any direction and is provided at its base, in the longitudinal and transverse directions, with two angle pieces 33 and 34. Any displacement of the control column brings about an action on the rods 38 and 39 articulated to the ends 35 and 36 of the angle pieces by means of ball joints. The two rods 38 and 39 transmit the displacements of the control column to the levers of the coupled valves 46 and 47 and 48 and 49 through the intermediary of levers 40 and 43, dashpots 41 and 44 identical with the dashpot 6 of Figs. 2 and 3, and rods 50 and 51. Two systems of opposing springs 42 and 45 similar to the spring system 4 and 5 of Figs. 2 and 3, maintain the valves in the neutral position, that is to say in the semi-open position. These valves distribute compressed air to four auxiliary nozzles or pneumatic spoilers situated opposite one another in pairs 52 and 53, 54 and 55, situated peripherally of the outlet cross-section of the main jet propulsion nozzle. Each pair of valves supplies two diametrally oppositely disposed spoilers, and in each pair the valves are so arranged that the complete opening of one of the valves is associated with the complete closure of the other, and vice versa.

If the pilot moves the control column forwardly in the direction of the arrow AV, the valves 47 and 49 will be closed through the agency of the rodding, whilst the valves 46 and 48 will be opened wide and will permit full supply to the spoilers 55 and 52.

In their turn, the spoilers 53 and 54 will cease to be supplied and finally the jet will be deflected. The combination of the rodding and the movements of the valves is such that the deflection of the jet will cause the aircraft, which is assumed to be in vertical flight, to rock about the Y or pitch axis in the direction of movement of the control column. (In Fig. 4 it is assumed that the orifice of the jet propulsion nozzle is seen from below with the aircraft in vertical attitude.) But this rocking about the Y axis is accompanied by the production of a torque due to the gyroscopic effects, which will tend to incline the aircraft relatively to the Y axis by causing it to pivot about the Z or yaw axis. This pivoting will be neutralised by the emission from the spoiler 55, which will deflect the jet in the direction opposite to the action of the gyroscopic effect, and will annul the latter. Under the cooperating action of the spring systems 42 and 45 and dashpots 41 and 44, the valves will resume their neutral position and the aircraft will continue to pivot only about the Y axis under the effect of the impulse received, until the pilot replaces the column to the zero position and the valves are actuated in the opposite direction, bringing about an impulse in the direction opposite to the first impulse, stopping the rotation of the aircraft about the Y axis.

Figure 5:
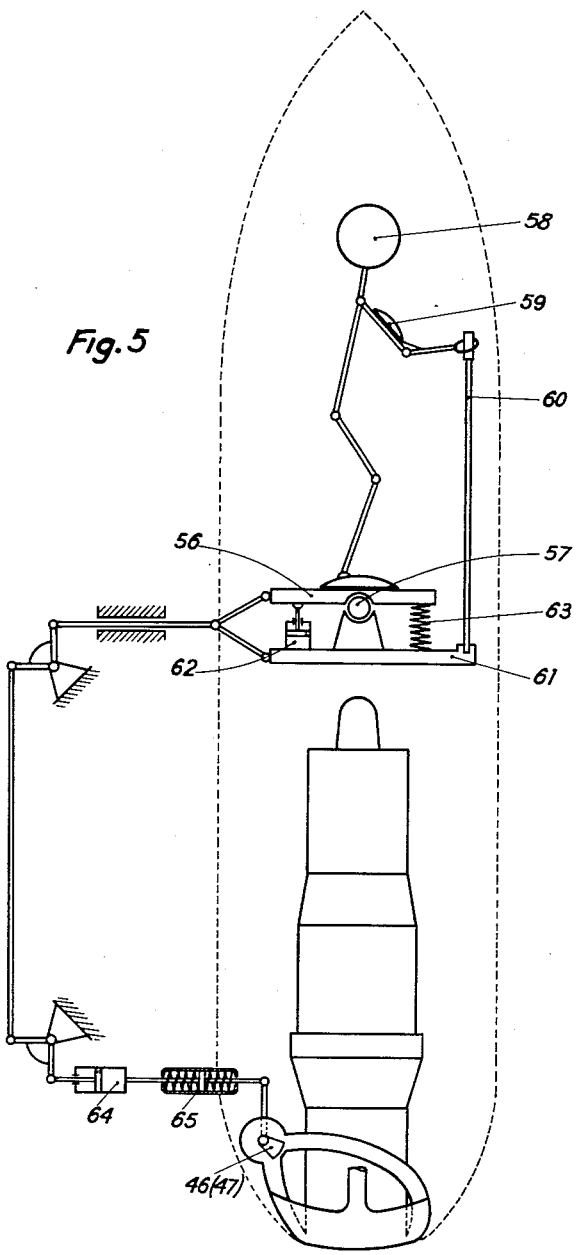
Fig. 5 shows a diagrammatic side elevation of an application of the control apparatus according to the invention to the vertical stabilisation of an aircraft in vertical flight, with the use of the pilot's own balance-controlling organs and instinctive reflexes.

As a final example of application, Fig. 5 shows a lateral elevation of the organisation of the vertical stabilisation of an aircraft in vertical flight, utilising, for the instigation of the control operation, the pilot's own balance-controlling organs and instinctive reflexes.

In this example of application, the pilot is standing upright in the centre of a plate 56 situated in the upper portion of the aircraft and resting on a ball member 57. Any undesirable inclination of the aircraft will be perceived by the pilot, whose balance-controlling organs, constituted by the semi-circular ducts of the inner ear 58, are situated in the part of the pilot's body furthest from the centre of gravity of the aircraft and consequently, from the spatial point of view, in a condition of maximum sensitivity. In trying instinctively to re-establish his own vertical position, the pilot rocks the plate on which he is standing, which has the result of controlling, through the agency of a suitable rodding system, the valves controlling the supply of compressed air to the spoilers surrounding the outlet of the jet engine nozzle. The jet deflected by the emissions injected by these spoilers will give an impulse in the desired direction to re-align the aircraft. In Fig. 5, there has only been shown the control system for stabilising the aircraft about the pitch axis, but according to the invention a second control system identical to that shown here is provided in order to control the stability of the aircraft about the yaw axis perpendicular to the pitch axis and parallel to the plane of the figure.

The return of the valves to the neutral position may be brought about either by personal action on the part of the pilot, or by one or more damping systems each comprising a dashpot and a system of opposing springs identical to those described hereinbefore.

Figure 5 shows three damping means. The first is constituted by the arm muscle 59 of the pilot holding the control column 60 fast with the plate 61, the latter being mobile relatively to the ball member 57 and situated below the plate 56, the ball member 57 being fast with the aircraft only. In this case, the pilot's arm acts as a spring and dashpot operated in phase-displaced manner. The second means is constituted by the dashpot 62 and the spring system 63. The third means is constituted by the dashpot 64 and the spring system 65.

According to the invention, in the example of application in question, it is possible to choose from four different damping and restoring combinations, using these three damping and restoring means.

(a) Using only the first means, dispensing with the two others;

(b) Using the first and third means, and not the second;

(c) Using only the second means, and dispensing with the first and third;

(d) Using the first and second means, dispensing with the third.

It is pointed out that if the combinations (a), (b) and (d) are used, wherein the arm of the pilot is used as a shock-absorbing member, the handling of the column 60 only has the effect of damping the control movements, whilst the impulses result solely from the movements of the plate 56 which follows the oscillations of the pilot's body.

Finally, it should be noted how extremely simple are the apparatuses used in the examples of application described hereinbefore, since these apparatuses only required systems whereby transmission is effected by roddings simple in themselves, and the handling of these apparatuses utilises merely the natural sense of balance of the human being piloting the aircraft.

What we claim is:

1. In a vertical take-off and landing aircraft powered by a turbo-jet engine and steered by controllable jet operating means generating reaction control torques on said aircraft, a vertical attitude stabilizing and control device comprising a pilot's control and a transmission between said pilot's control and said torque generating means, which transmission includes a movable member controlling said torque generating means, a return spring urging said movable member into a neutral position wherein no torque is generated, and a dashpot operatively associated in series with said spring for damping and slowing down the return action thereof.

2. Device as claimed in claim 1 wherein the movable control member is a compressed air distributor valve system and the torque generating means are auxiliary nozzles selectively supplied with compressed air through said distributor valve system.

3. Device as claimed in claim 2 wherein the distributor valve system comprises a multiple-way cock, the auxiliary nozzles controlled thereby are arranged for generating reaction torques about the roll axis of the aircraft, and the pilot's control comprises a rod extending parallel to and rotatable about said axis.

4. Device as claimed in claim 3, comprising further a turbo-jet running control and an interconnecting linkage between said running control and the transmission, said linkage being operatively associated with said transmission in such a way that the algebraic sum of the control actions of the pilot's control and the running control is applied to the cock.

5. Device as claimed in claim 4, wherein the linkage and transmission comprise an articulated triangle, the apices of which are respectively connected with the pilot's control, the turbo-jet running control and the cock, and one of the sides of which includes the dashpot.

6. Device as claimed in claim 2 wherein the distributor valve system comprises two pairs of conjugate valves operated in opposition, the auxiliary nozzles extend over four successive segments of the periphery of the turbo-jet engine outlet, at 90° with each other, each pair of conjugate valves being associated with a pair of diametrically opposite nozzles.

7. Device as claimed in claim 6 wherein the pilot's control is a swingable column and each pair of conjugate valves is under the control of said column through a transmission which includes a return spring and a dashpot.

8. Device as claimed in claim 7 wherein the conjugate valves of each pair have a mean position in which the respective nozzles are equally supplied, said position corresponding to a mean position of the column.

References Cited in the file of this patent

UNITED STATES PATENTS

| | | |
|---|---|---|
| 2,125,361 | Schwarzler | Aug. 2, 1938 |
| 2,395,809 | Goddard | Mar. 5, 1949 |
| 2,668,026 | Price | Feb. 2, 1954 |
| 2,719,684 | Peed | Oct. 4, 1955 |
| 2,846,164 | Haberkorn | Aug. 5, 1958 |

FOREIGN PATENTS

| | | |
|---|---|---|
| 1,168,730 | France | Mar. 1, 1957 |